April 29, 1952 — H. G. ANDRÉ — 2,594,710
ZINC-SILVER ACCUMULATOR
Filed Dec. 20, 1948

INVENTOR
HENRI G. ANDRE
BY Karl F. Ross
AGENT

Patented Apr. 29, 1952

2,594,710

UNITED STATES PATENT OFFICE 2,594,710

ZINC-SILVER ACCUMULATOR

Henri G. André, Montmorency, France, assignor to Yardney International Corp., New York, N. Y., a corporation of New York Application December 20, 1948, Serial No. 66,291
In France July 28, 1948

7 Claims. (Cl. 136—6)

My invention has for its object improvements in zinc-silver accumulators wherein the cycle of operation is designed in a manner such that the discharge brings the negative electrode from its metal state to the zinc oxide or zinc hydroxide state while the charge brings it back from the state of oxide or hydroxide to its reduced metallic zinc state, no modification occurring in the electrolytic solution by reason of its preliminary saturation as to zincic salts.

Hitherto a zinc carrier was used part of which was adapted to be transformed into an oxide, whether hydrated or otherwise.

In this technique in the case of a protracted discharge, a total oxidation of the zinc risks rendering it less suitable as a support while the amount of oxide formed risks becoming abnormally bulky through crystallisation with the electrolyte water which leads to an inadmissible compression and expansion thereof inside the cell.

In order to define an upper limit for this oxidation during a protracted discharge, I have provided according to my present invention the substitution, for an undefined mass of zinc in excess, of a homogeneous mass of zinc oxide that may be easily distributed round the positive silver electrode and of which it is possible to calculate beforehand the zinc contents that should correspond to the electro-chemical equivalent, transformed by the discharge.

The current is then fed to this homogeneous mass through any suitable means such as a metal grid that cannot dissolve in the electrolyte (e. g. potash) and that may be easily brought to a voltage corresponding to the zinc potential, said grid being made for instance of brass, copper, silver, etc.

The zinc oxide may be admixed with potash or a suitable alkaline composition so as to form a paste in which is dipped the positive electrode that is previously protected by a wrapper made of viscose foil such as cellophane.

According to a preferred procedure, I avoid the introduction into the positive compartment of any finely subdivided zinc oxide by using a negative electrode the structure of which is identical with that of pulverulent silver and by pasting the metallic grid therewith and then packing the whole arrangement in the same manner as the positive electrode made of pulverulent silver. In an alternative, the negative electrode is a zinc plate wrapped inside a viscose foil wrapper.

The two electrodes thus pasted and suitably packed are juxtaposed in intimate relationship without any risk of the actual silver and zinc oxide powders coming into contact.

This perfect separation provides an excellent conservation of the charge conditions in open circuit together with complete regularity in the structure of the elements thus constituted which would be very difficult to obtain with the prior structures proposed.

The accompanying drawing shows by way of example an embodiment of a cell enclosing two packed electrodes of which the positive cell has a pulverulent silver base and the negative one a pulverulent zinc oxide base or again the positive electrode may have a pulverulent silver peroxide base and the negative one a pulverulent zinc base if it is desired to obtain a charged cell.

Figure 1A:
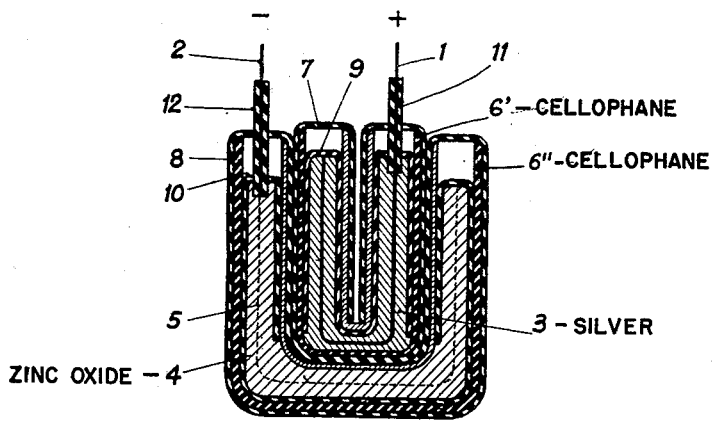
Fig. 1A illustrates cross-sectionally a simple cell.

As shown in Fig. 1A the silver lead 1 feeds current to the pulverulent silver electrode 3 in which is a silver lead. The lead 2 feeds current to the pulverulent zinc oxide electrode 4 through the grid 5, made of a metal that is insoluble in the electrolyte.

The pulverulent silver 3 is held inside a wrapper of cellophane 6' while the pulverulent zinc oxide is held inside a cellophane wrapper 6''. The outer wrappers 7 and 8 protect respectively the wrappers 6' and 6'' that are also protected inwardly by the wrappers 9 and 10. Rubber tubes 11 and 12 protect and insulate the connecting wires 1 and 2.

Figure 1B:
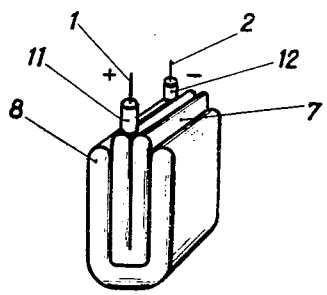
Fig. 1B is a perspective view showing from the outside the block of electrodes appearing cross-sectionally in Fig. 1A.

Figs. 1A and 1B show that with such a double protection no particle of active material may pass from the positive compartment into the negative compartment or reversely.

Figure 2:
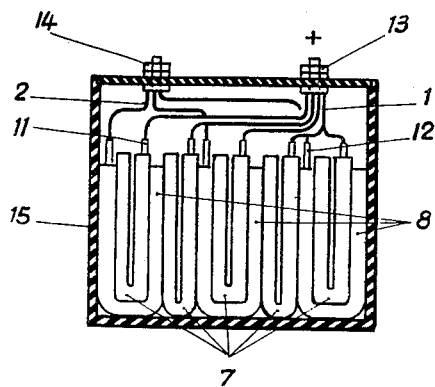
Fig. 2 is a cross-section of a system of several cells inserted in parallel in the same container.

Turning to Fig. 2 showing a system of parallel cells inside a common container 15, the inner conductibility is ensured through the mere juxtaposition of the positive packages 7 and of negative packages 8 that are impregnated with the electrolyte filling the container 15. The groups of wires 1 and 2 are connected with the terminals 13 and 14 in parallel.

It is possible to obtain the electrodes shaped as illustrated by packing flat the powders and feeding leads thereto inside cellophane sheets, superposing the flat packages thus obtained and folding the superposed packages for introducing them into the container.

The risk of the electrolyte being dissociated during the final stage of the charge, the zinc being precipitated out of its solution at such a moment—so that the excess voltage forming an indication of the end of the charges appears after a certain destruction of the cell is already under way—is prevented by making the positive electrode give out the signal of the end of the charge by reason of an excess of active negative material that remains in place during the whole operation.

Furthermore, further and automatic safety is obtained through the fact that the electrodes wrapped according to the invention retain the gases at the end of the charge so that the electrodes are enclosed inside a gaseous sheath and the charging current is almost completely cut off.

It should be noticed that in accumulators according to the invention, it is very easy to keep the cell in its discharged state by reason of the fact that the metal on the negative side is naturally in its oxidized state and cannot therefore be deteriorated through oxidation.

What I claim is:

1. In an electrochemical generator of energy, in combination, a positive electrode and a negative electrode, at least one of said electrodes comprising an electrochemically active material and an electrolyte-permeable insulating envelope enclosing said material, said envelope being folded substantially in the form of a U with upstanding arms, the other of said electrodes being enfolded by the arms of the U.

2. In an electrochemical generator of energy, in combination, a positive electrode and a negative electrode, each of said electrodes comprising an electrochemically active material and an electrolyte-permeable insulating envelope enclosing said material, each of said envelopes being folded substantially in the form of a U with upstanding arms, one of said electrodes being enfolded by the arms of the other of said electrodes.

3. The combination according to claim 2, including a pair of conductors each entering a respective one of said electrodes through one of the arms of the U thereof.

4. An electric storage battery comprising a container, an alkaline electrolyte in said container, said electrolyte being saturated with zinc, a negative electrode in said electrolyte containing zinc as an active material, a positive electrode in said electrolyte containing a metal more electropositive than zinc as an active material, the active material of at least one of said electrodes being in comminuted form, an electrolyte-permeable envelope of insulating material enclosing said comminuted material, said envelope separating said active materials from each other and being folded substantially in the form of a U with upstanding arms enfolding the other of said electrodes, and means including said container maintaining said envelope under compression, thereby regulating the size of the pores thereof and enabling repeated recharging of the battery.

5. An electric storage battery according to claim 4 wherein said more electropositive metal is silver.

6. An electric storage battery comprising a container, an alkaline electrolyte in said container, said electrolyte being saturated with zinc, a negative electrode in said electrolyte containing zinc in comminuted form, a first electrolyte-permeable envelope of regenerated cellulose enclosing said comminuted zinc, a positive electrode in said electrolyte containing an electrochemically active powder more electropositive than zinc, a second electrolyte-permeable envelope of insulating material enclosing said powder, each of said envelopes being folded substantially in the form of a U with upstanding arms, the arms of one of said envelopes enfolding the other of said envelopes, and means including said container maintaining said envelopes under compression, thereby regulating the size of the pores thereof and enabling repeated recharging of the battery.

7. An electric storage battery according to claim 6 wherein said electrochemically active powder is comminuted silver.

HENRI G. ANDRÉ.

REFERENCES CITED

The following references are of record in the file of this patent:

UNITED STATES PATENTS

| Number | Name | Date |
| --- | --- | --- |
| 309,939 | Faure | Dec. 30, 1884 |
| 512,473 | Irving | Jan. 9, 1894 |
| 726,272 | Feldkamp | Apr. 28, 1903 |
| 976,092 | Morrison | Nov. 15, 1910 |
| 2,317,711 | Andre | Apr. 27, 1943 |
| 2,422,045 | Ruben | June 10, 1947 |

FOREIGN PATENTS

| Number | Country | Date |
| --- | --- | --- |
| 139,169 | Great Britain | June 16, 1921 |